(12) United States Patent
Goodwin, III et al.

(10) Patent No.: US 6,696,920 B1
(45) Date of Patent: Feb. 24, 2004

(54) METHOD OF CHANGING AN ELECTRONIC PRICE LABEL DISPLAY SEQUENCE

(75) Inventors: John C. Goodwin, III, Suwanee, GA (US); Terry L. Zimmerman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/409,576

(22) Filed: Sep. 30, 1999

(51) Int. Cl.[7] ............................ G05B 19/00; G06F 17/60
(52) U.S. Cl. .................... 340/5.91; 340/5.92; 340/525; 235/383; 345/962; 705/20; 705/21; 705/16
(58) Field of Search .......................... 340/5.91, 5.92, 340/525; 705/16, 20, 21, 23, 28; 235/383, 385; 345/962

(56) References Cited

U.S. PATENT DOCUMENTS

| | | | |
|---|---|---|---|
| 4,002,886 A | 1/1977 | Sundelin ............... 235/61.7 R |
| 4,500,880 A | 2/1985 | Gomersall et al. ..... 340/825.35 |
| 4,924,363 A | 5/1990 | Kornelson ................. 362/125 |
| 5,172,314 A | 12/1992 | Poland et al. ............... 364/401 |
| 5,448,226 A | 9/1995 | Failing, Jr. et al. ..... 340/825.35 |
| 5,632,010 A | * 5/1997 | Briechle et al. .............. 705/20 |
| 5,794,211 A | 8/1998 | Goodwin, III et al. ....... 705/23 |
| 6,317,724 B1 | * 11/2001 | Goodwin, III et al. ....... 705/20 |
| 6,442,531 B1 | * 8/2002 | Goodwin, III ............... 705/20 |

* cited by examiner

Primary Examiner—Donnie L. Crosland
(74) Attorney, Agent, or Firm—Paul W. Martin

(57) ABSTRACT

A method of changing a display sequence of an electronic price label which uses two commands to add and remove information from a display sequence. The method includes the steps of formulating a change sequence message including a number of change sequence commands which reference memory registers of the electronic price label, and sending the change sequence message to the electronic price label. An Add command causes the electronic price label to additionally display data in a predetermined memory register. A Remove command causes the electronic price label to stop displaying data in a predetermined memory register. If data accompanies an Add command, the method further determines whether such data will overwrite existing data in the predetermined memory register, and if it will, stores the existing data for later retrieval.

3 Claims, 3 Drawing Sheets

METHOD OF CHANGING AN ELECTRONIC PRICE LABEL DISPLAY SEQUENCE

BACKGROUND OF THE INVENTION

The present invention relates to electronic price label (EPL) systems, and more specifically to a method of changing an EPL display sequence.

EPL systems typically include a plurality of EPLs for merchandise items in a transaction establishment. EPLs typically display the price of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs are also being used to display more than just price information. Retailers are using EPLs to display promotional information in order to more effectively market associated merchandise items. During off-peak hours, retailers display inventory and status information for the benefit of employees. EPLs may be programmed to display more than one type of information in sequences using flashing and scheduling techniques.

However, EPLs have limited memory capacity for storing the many types of information which must be displayed. For example, a typical EPL has four data registers which can simultaneously store, at most, two types of information. Therefore, it would be desirable for providing a method of changing display sequences despite the memory capacity limitation of an EPL.

SUMMARY OF THE INVENTION

In accordance with the teachings of the present invention, a method of changing an EPL display sequence is provided.

The method includes the steps of formulating a change sequence message including a number of change sequence commands which reference memory registers of the electronic price label, and sending the change sequence message to the electronic price label.

An Add command causes the electronic price label to additionally display data in a predetermined memory register. A Remove command causes the electronic price label to stop displaying data in a predetermined memory register. If data accompanies an Add command, the method further determines whether such data will overwrite existing data in the predetermined memory register, and if it will, stores the existing data for later retrieval.

The electronic price label system includes an electronic price label including a memory, and a computer. The computer formulates a change sequence message including a number of change sequence commands which reference memory registers of the electronic price label, and sends the change sequence message to the electronic price label. The available change sequence commands include a first command which causes the electronic price label to additionally display first data in a first memory register and a second command which causes the electronic price label to stop displaying second data in a second memory register.

It is accordingly an object of the present invention to provide a method of changing an EPL display sequence.

It is another object of the present invention to provide a method of temporarily changing an EPL display sequence.

It is another object of the present invention to add display information to a display sequence.

It is another object of the present invention to add display information not already in memory to a display sequence.

It is another object of the present invention to remove display information from a display sequence.

It is another object of the present invention to provide a method of displaying a different type of information under a display sequence using a limited amount of memory.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
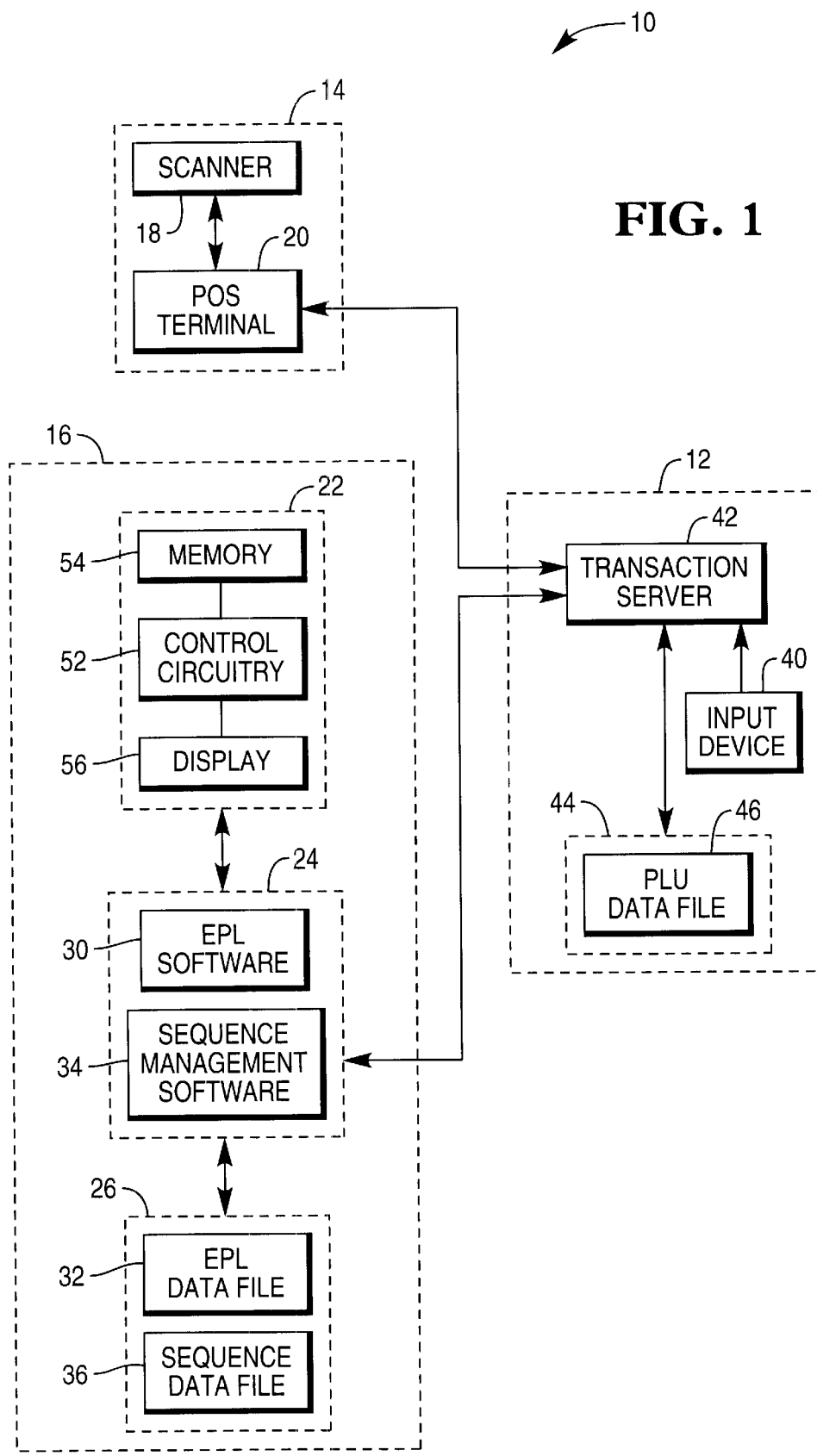
FIG. 1. is a block diagram of a transaction processing system.

Referring now to FIG. 1, a first embodiment of transaction system 10 primarily includes host computer system 12, point-of-sale (POS) system 14, and EPL system 16. Here, components 12, 14, and 16 are shown as separate components that are networked together, but they may also be combined in different ways to form less components. Thus, host computer system 12 may be a POS terminal which doubles as a host computer for network of other POS terminals. Also, host computer system 12 and EPL system 16 may be combined into a single system.

POS system 14 includes bar code reader 18 and terminal 20.

EPL system 16 primarily includes EPLs 22, host EPL terminal 24, and EPL storage medium 26.

EPLs 22 include control circuitry 52, data memory 54 and displays 56.

Control circuitry 52 receives and transmits messages from EPL terminal 24 and controls display of information by display 56. Control circuitry 52 stores data and instructions within the messages. For example, control circuitry 52 stores price and promotional information in memory 54. Control circuitry also stores display sequence information in memory 54 and responds to basic control instructions, including instructions to add or remove display information from a display sequence.

Host EPL terminal 24 executes EPL software 30. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting data to EPLs 22. EPL software 30 obtains prices in price look-up (PLU) data file.

Host EPL terminal 24 also executes sequence management software 34 which manages display sequence changes. A display sequence instruction tells EPL 22s to display the contents of memory registers identified in the sequence instruction. Under the present invention, sequence management software 34 automatically or in response to operator-initiated commands changes display sequences. For example, the message may include an instruction to cause EPL 22 to alternatingly flash price information and promotional information in accordance with a new display sequence. Sequence management software 34 may additionally send display data to the extent that a display sequence change calls for display data, e.g. promotional information, which is not already in memory 54.

EPL storage medium 26 stores EPL data file 32 sequence data file 36. EPL storage medium 26 and is preferably a fixed disk drive.

EPL data file 32 contains EPL identification and checksum information. Checksum information is calculated from price information in PLU data file 46. EPL data file 32 identifies information that is currently stored and displayed by EPLs 22, including memory register information.

Host computer system 12 includes PLU storage medium 44, transaction server 42, and input device 40.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 18.

Figure 2A:
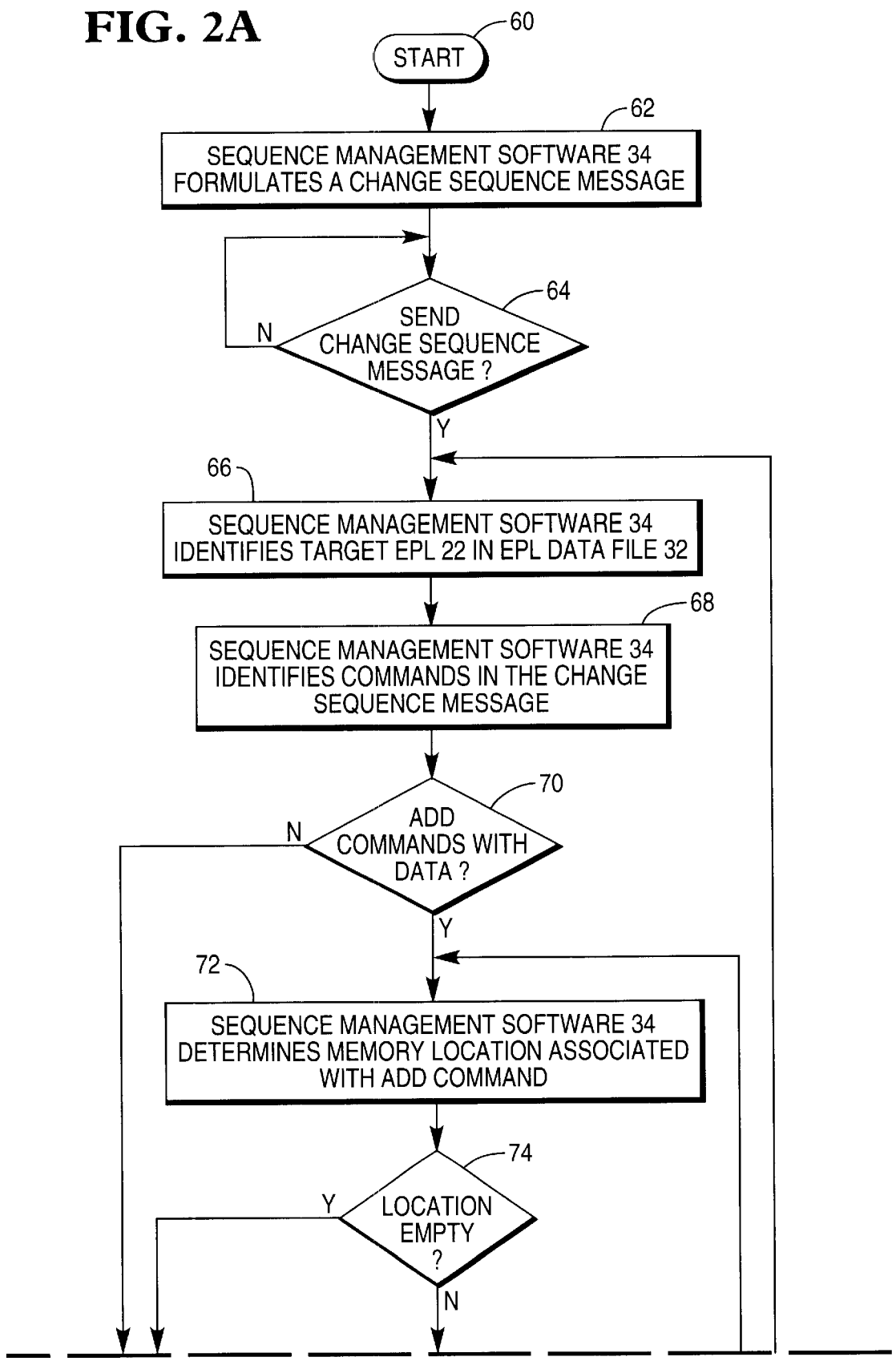
FIGS. 2A and 2B form a flow diagram illustrating a sequence management method.
Figure 2B:
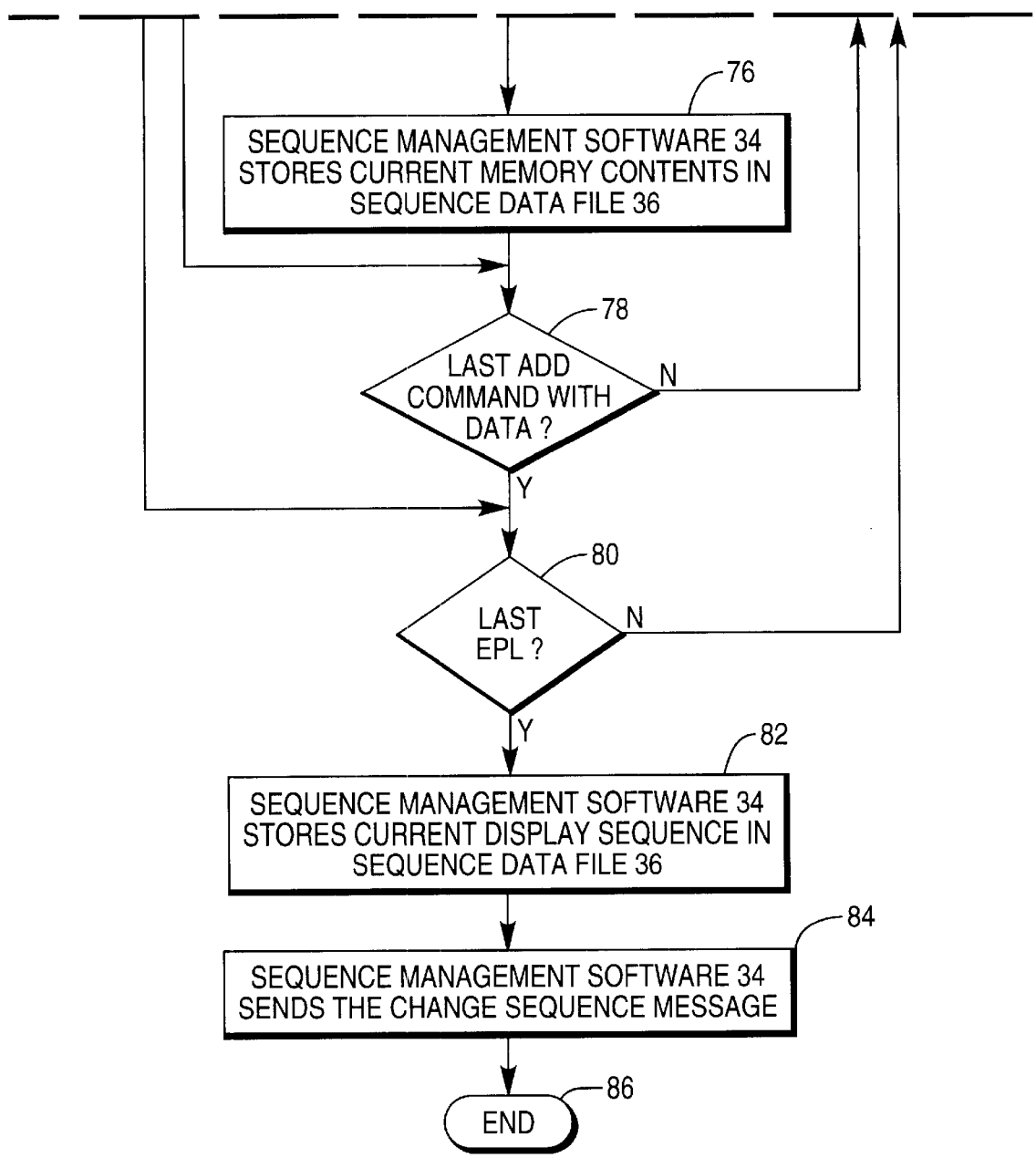

Turning now to FIGS. 2A and 2B, a sequence management method is illustrated beginning with START 60.

In step 62, sequence management software 34 formulates a change sequence message. The change sequence message could be a broadcast message addressed to all EPLs 22 or an individual message addressed to a single EPL 22.

If the message requires data to be displayed that is not already being displayed, then sequence management software 34 includes an Add command in the message. If the message requires data to be displayed that is not already stored within EPLs 22, then sequence management software 34 retrieves the data from its data source and places it in the message with the Add command. Similarly, if the message requires data to no longer be displayed, then sequence management software 34 includes a Remove command. More than one command may be included in a message.

In step 64, sequence management software 34 waits for an indication to have EPL software 30 send the change sequence message. The indication may come from its own internal scheduler (automatic operation) or from operator action (manual operation) following formulation of the message.

If the change sequence message must be sent, steps 66–82 are implemented prior to sending. Sequence management software 34 examines the change sequence message for overwritten data and stores any overwritten data and the current display sequence in sequence data file 36.

In step 66, sequence management software 34 identifies a target EPL 22 in EPL data file 32.

In step 68, sequence management software 34 identifies commands within the change sequence message.

In step 70, sequence management software 34 determines whether the sequence change involves any Add commands and associated data. If so, operation proceeds to step 72. If not, no data will be overwritten and operation proceeds to step 80 to check for another EPL 22.

In steps 72–78, sequence management software 34 determines whether the sequence change will overwrite data currently in memory 54. Overwriting of data occurs when the change sequence message contains an Add command whose location argument points to a location in memory 54 which currently contains data and new data accompanies the Add command.

In step 72, sequence management software 34 determines the memory 54 location associated with an Add command.

In step 74, sequence management software 34 determines by reading EPL data file 32 whether that memory location is currently empty. If so, data will not be overwritten and operation proceeds to step 76 to check for another Add command. If not, data will be overwritten and operation proceeds to step 76.

In step 76, sequence management software 34 stores current memory contents in sequence data file 36.

In step 78, sequence management software 34 determines whether the Add command with data is the last Add command with data. If so, operation proceeds to step 80. If not, operation returns to step 72.

In step 80, sequence management software 34 determines whether the EPL is the last EPL. If so, operation proceeds to step 82. If not, operation returns to step 66.

In step 82, sequence management software 34 stores the current display sequence in sequence data file 36. The current display sequence may be retrieved and implemented in another change sequence message if the new display sequence is a temporary display sequence.

In step 84, sequence management software 34 sends the change sequence message. The message may be a broadcast message or an individually-addressed message and operation ends at step 86.

For example, suppose that a first display sequence for a target EPL 22 includes only price information from a first register in memory 54. Suppose that a new display sequence adds a promotional message to the display sequence. If the promotional information is not stored within memory 54, then a change sequence message to EPL 22 would contain the promotional information, instructions for storing the promotional information in a second memory 54 register, and an Add command pointing to the second memory 54 register. The change sequence message could have additional instructions, such as flashing instructions. If the promotional information is already stored within the second memory 54 register, then the change sequence message would only require the Add command.

As another example, suppose that a first display sequence for a target EPL 22 includes three types of display information: price information, a first promotional message (e.g., "SALE"), and a second promotional message (e.g., "SAVE 0.40"). The display sequence includes instructions for displaying the three types of information. In order to replace the first promotional message with a third promotional message, sequence management software 34 would send a change sequence message containing an Add command which references a memory location where the first promotional message is stored, the third promotional message, and instructions for storing the third promotional message in the memory location. The first promotional message is overwritten by the third promotional message. Therefore, sequence management software 34 stores the first promotional message in sequence data file 36.

Advantageously, the method of the present minimizes storage problems in EPLs 22 having limited memory capacity. EPLs 22 may quickly return to a current display sequence following a temporary display sequence.

Although the present invention has been described with particular reference to certain preferred embodiments thereof, variations and modifications of the present invention can be effected within the spirit and scope of the following claims.

What is claimed is:

1. A method of temporarily changing a first display sequence of an electronic price label to a second display sequence comprising the steps of:

(a) formulating a first change sequence message including a first change sequence command which references a predetermined location in a memory of the electronic price label and which modifies the first display sequence to create the second display sequence, and including first data associated with the first change sequence command which will be displayed in accordance with the second display sequence;

(b) determining whether execution of the first change sequence command by the electronic price label will overwrite existing data in the memory of the electronic price label;

(c) if execution of the first change sequence command will overwrite the existing data in the memory, storing the existing data;

(d) sending the first change sequence message to the electronic price label;

(e) formulating a second change sequence message including a second change sequence command which references the predetermined location in the memory and which modifies the second display sequence to create the first display sequence, and including the existing data overwritten by the first change sequence command; and (f) sending the second change sequence message to the electronic price label following a temporary period.

2. A method of changing a display sequence of an electronic price label comprising the steps of:

(a) formulating a change sequence message including a number of change sequence commands which reference memory registers of the electronic price label, wherein the change sequence commands include a first command which causes the electronic price label to additionally display first data in a first memory register and a second command which causes the electronic price label to stop displaying second data in a second memory register; and (b) if the change sequence message includes the first command, determining whether execution of the first command by the electronic price label will overwrite existing data in the first memory register;

(c) if execution of the first command will overwrite the existing data, storing the existing data; and (d) sending the change sequence message to the electronic price label.

3. An electronic price label system comprising:

an electronic price label including a memory; and a computer which formulates a change sequence message including a change sequence command which references a predetermined location in the memory of the electronic price label and new data associated with the change sequence command, which determines whether execution of the change sequence command by the electronic price label will overwrite existing data in the memory of the electronic price label, which stores the existing data if execution of the change sequence command will overwrite the existing data, which sends the change sequence message to the electronic price label, which formulates another change sequence message including another change sequence command which references the predetermined location in the memory and including the existing data overwritten by the new data, and which sends the other change sequence message to the electronic price label following a temporary period.

* * * * *